United States Patent [19]

Bayer

[11] Patent Number: 5,306,542
[45] Date of Patent: Apr. 26, 1994

[54] PLASTIC CLOSURE WITH COMPRESSION MOLDED SEALING LINER

[75] Inventor: John W. Bayer, Perrysburg, Ohio

[73] Assignee: Owens-Illinois Closure Inc., Toledo, Ohio

[21] Appl. No.: 16,356

[22] Filed: Feb. 11, 1993

[51] Int. Cl.[5] ............................................. B32B 23/02
[52] U.S. Cl. ................................ 428/192; 428/411.1; 428/474.4; 428/475.8; 428/500; 215/341; 215/DIG. 2
[58] Field of Search .......... 215/349, 350, 341, DIG. 2; 428/192, 411.1, 474.4, 475.8, 500

[56] References Cited

U.S. PATENT DOCUMENTS

| | | | |
|---|---|---|---|
| 2,938,879 | 5/1960 | Mock et al. | 260/32.6 |
| 2,956,035 | 10/1960 | Mock | 260/23 |
| 3,176,021 | 3/1965 | Volungis et al. | 260/32.6 |
| 3,210,805 | 10/1965 | Hanai | 18/20 |
| 3,330,801 | 7/1967 | Evers et al. | 260/45.9 |
| 3,400,094 | 9/1968 | Testa | 260/32.6 |
| 3,406,854 | 10/1968 | Testa | 215/40 |
| 3,474,058 | 10/1969 | Ridgeway et al. | 260/23 |
| 3,562,291 | 2/1971 | Lutzmann et al. | 260/32.6 |
| 3,955,605 | 5/1976 | Zupan | 141/1 R |
| 4,080,136 | 3/1978 | Peller | 425/295 |
| 4,277,431 | 7/1981 | Peller | 264/148 |
| 4,322,503 | 3/1982 | Chatterjee | 524/229 |
| 4,343,754 | 8/1982 | Wilde et al. | 264/154 |
| 4,418,828 | 12/1983 | Wilde et al. | 215/252 |
| 4,463,116 | 7/1984 | Koyama et al. | 524/232 |
| 4,529,764 | 7/1985 | McKinney et al. | 524/232 |
| 4,619,848 | 10/1986 | Knight et al. | 428/35 |
| 4,619,959 | 10/1986 | Matsubara et al. | 524/228 |
| 4,675,122 | 6/1987 | Lüers et al. | 252/28 |
| 4,749,736 | 6/1988 | Khanna et al. | 524/230 |
| 4,753,760 | 6/1988 | Kawaguchi et al. | 264/28 |
| 4,807,772 | 2/1989 | Schloss | 215/349 |
| 4,846,362 | 7/1989 | Schloss | 215/349 |
| 4,897,437 | 1/1990 | McKinney et al. | 524/232 |
| 4,984,703 | 1/1991 | Burzynski | 215/350 |
| 5,120,787 | 6/1992 | Drasner | 524/524 |

Primary Examiner—Patrick J. Ryan
Assistant Examiner—Marie R. Macholl

[57] ABSTRACT

A plastic closure including a base wall having an inner surface, a peripheral skirt extending from the base wall and a liner on the inner surface of the base wall. The liner includes (a) an ethylene vinyl acetate composition, (b) a primary fatty acid amide and (c) a bis-fatty acid amide. Preferably the primary fatty acid amide comprises an oleamide or an erucamide, and the bis-fatty acid amide comprises ethylene-bis-stearamide.

2 Claims, No Drawings

PLASTIC CLOSURE WITH COMPRESSION MOLDED SEALING LINER

This invention relates to molded plastic closures and particularly to compression molded plastic closures having compression molded liners therein.

BACKGROUND AND SUMMARY OF THE INVENTION

Plastic closures have been commonly made by injection molding or compression molding. In plastic closures made by compression molding as shown, for example, in U.S. Pat. Nos. 3,210,805, 4,343,754, and 4,418,828, incorporating herein by reference, it is also common to compression mold a sealing liner in place in the closure after the closure has been formed. Such sealing liners may comprise polyvinyl chloride plastic or thermoplastic elastomeric compositions. Polyvinyl chloride has a tendency to overheat during extrusion and further has inherent problems because of the removal torque when the sealing liner is used on a PET container. Thermoplastic polymeric compositions are most expensive and are more difficult to produce in that the compounding necessary results in inconsistent quality and consistency. Futhermore, such compositions produce problems of torque removal of glass containers. U.S. Pat. Nos. 4,807,772 and 4,845,362 disclose a compression molded liner being made of a blend of polyethylene or polypropylene and thermoplastic elastomeric copolymer so that the liner is removable.

As a result of the problems with both types of compositions, it has been necessary for a user to maintain costly inventories of closures with both types of sealing liners in order to accommodate use with both plastic and glass containers.

In order to produce a satisfactory sealing liner that would be applicable to both plastic and glass containers, it must be necessary to not only formulate the composition but also consistently extrude and cut off charges of the composition for compression molding in apparatus such as shown, for example, in U.S. Pat. Nos. 3,995,605, 4,080,136 and 4,277,431. The closure must also match other closure requirements including satisfactory removal torques, carbonation retention, and carbonation retention under load and satisfactory functioning on a container when cycled through environmental changes of temperature and humidity.

In U.S. Pat. Nos. 4,984,703 there is disclosed a compression molded plastic closure having a compression molded sealing liner which fulfills the requirements of a carbonated beverage closure and operates satisfactory on both plastic and glass containers.

When a plastic beverage cap has been provided with an ethylene vinyl acetate liner, it has been found that erratic high removal torques have been provided, the erratic high removal torques are not eliminated. Various efforts have been proposed as disclosed in U.S. Pat. Nos. 3,400,094, 3,406,854, and 4,463,116 that utilize lubricants but, as far as the present inventor knows, have been without success.

Among the objectives of the present invention are to provide a plastic closure with a sealing liner that comprise an ethylene vinyl acetate composition and includes other components that provide for uniform removal torques; wherein the closure is useful in cold climate conditions with migration of the lubricant to the surface of the liner; wherein the liner can be compression molded in the plastic closure; or where the liner can be molded and then inserted in the closure.

In accordance with the invention, a plastic closure includes a base wall having an inner surface, a peripheral skirt extending from the base wall and a liner on the inner surface of the base wall. The liner comprises (a) ethylene vinyl acetate composition, (b) a primary fatty acid amide and (c) a bis-fatty acid amide. Preferably the fatty acid amide comprises an oleamide or erucamide, and the bis-fatty acid amide comprises ethylene-bis-stearamide.

The oleamide or erucamide and the bis-fatty acid amide are preferably mixed before introduction into the ethylene vinyl acetate composition. The total amount of fatty acid amide and bis-fatty acid amide to the ethylene vinyl acetate is preferably at about 0.5%–1.5% by weight.

The ratio of fatty acid amide to bis-fatty acid amide is preferably 50:50 by weight but may range between 25:75 or 75:25 by weight.

DESCRIPTION

The plastic closure embodying the invention is made of suitable material such as polypropylene and comprises a base wall, a peripheral skirt having internal threads for engagement with complementary threads on a container and a sealing liner in the form of an annular shape at the juncture of the base wall and peripheral skirt. Such a closure may be of the type disclosed in U.S. Pat. No. 4,984,703, incorporated herein by reference. The closure may include tamper indicating means such as shown, for example, in U.S. Pat. Nos. 4,418,828, 4,613,052 and 4,653,657.

In accordance with the invention, the sealing liner comprises an ethylene vinyl acetate composition and a blend of a primary fatty acid and bis-fatty acid amide, which are believed to function as lubricants.

The oleamide or erucamide and the bis-fatty acid amide are preferably mixed before introduction into the ethylene vinyl acetate composition. The total amount of fatty acid amide and bis-fatty acid amide to the ethylene vinyl acetate is preferably at about 0.5%–1.5% by weight.

The ratio of fatty acid amide to bis-fatty acid amide is preferably 50:50 by weight but may range between 25:75 or 75:25 by weight.

The ethylene vinyl acetate composition comprises polyethylene as the major constituent and vinyl acetate and optionally includes antioxidants and pigments.

Fatty acid amides are based on fatty saturated and unsaturated straight-chain, monobasic acids derived from naturally occurring feedstocks. Predominant chain lengths range from eighteen to twenty-two carbon atoms. The primary amides are waxy solids with melting points in he range of 68–108° C.

Oleamide fatty acid amides comprise an unsaturated fatty primary amide derived from oleic acid wherein the major component is:

$$CH_3(CH_2)_7CH=CH(CH_2)_7CONH_2$$

Such an oleamide has the following physical properties:

| TYPICAL PROPERTIES | KEMAMIDE O |
|---|---|
| Molecular weight | 275 |
| Density @ 130° C. (266° F.), g/mL | 0.822 |

-continued

| TYPICAL PROPERTIES | KEMAMIDE O |
|---|---|
| Density @ 160° F. (71° C.), g/mL | 0.857 |
| Viscosity @ 130° C., cP | 5.5 |
| Heat of fusion, kcal/mol | 6.3 |
| Flash point, °C., COC | 245 |
| Fire point, °C., COC | 264 |

Erucamide fatty acid amides comprise unsaturated fatty primary amide derived from erucic acid wherein the major component is:

$$CH_3(CH_2)_7CH=CH(CH_2)_{11}CONH_2$$

Such an erucamide has the following physical properties:

| TYPICAL PROPERTIES | KEMAMIDE E |
|---|---|
| Molecular weight | 335 |
| Density @ 130° C. (266° F.), g/mL | 0.815 |
| Density @ 160° F. (70° C.), g/mL | 0.851 |
| Viscosity @ 130° C., cP | 6.4 |
| Heat of fusion, kcal/mol | 9.8 |
| Flash point, °C., COC | 262 |
| Fire point, °C., COC | 287 |

Ethylene bisamides are reaction products of saturated or unsaturated fatty acids and ethylenediamine.

A satisfactory fatty bisamide derived from stearic acid is: N,N'-ethylenebisstearamide when the major component is:

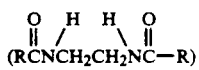

where R=stearyl

This fatty bisamide has the following properties:

| TYPICAL PROPERTIES | KEMAMIDE W-40 |
|---|---|
| Flash point, °C., COC | 299 |
| Fire point, °C., COC | 315 |
| Physical form | Flake Only |

Another satisfactory fatty bisamide derived from oleic acid is N,N'-ethylenebisoleamide herein the major component is:

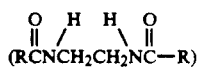

where R=oleyl

This fatty bisamide has the following properties:

| TYPICAL PROPERTIES | KEMAMIDE W-20 |
|---|---|
| Flash point, °C., COC | 296 |
| Fire point, °C., COC | 315 |
| Physical form | Power and pellet |

The ethylene vinyl acetate composition may have the composition within about the following ranges, by weight:

| | |
|---|---|
| Polyethylene | 85% to 94% |

-continued

| | |
|---|---|
| Vinyl acetate | 6% to 15% |

The primary fatty acid amide comprises either oleamide or erucamide.

The bis-fatty acid amide preferably comprises an ethylene-bis-stearamide.

The liner composition may include antioxidants and colorants as is conventionally used.

In a preferred form, the primary fatty acid amide and bis-fatty acid amide are mixed with a colorant and a carrier such as low density polyethylene and then this is provided for use with the ethylene vinyl acetate composition.

In an early experiment, the resin used were as follows:

| RESIN | MELT FLOW (gm/10 min) | DENSITY (gm/cc) | ACETATE % |
|---|---|---|---|
| Dupont Elvax 750 | 7.0 | 0.930 | 9.0 |
| Dupont Elvax 650 | 8.0 | 0.933 | 12.0 |
| Dupont Elvax 550 | 8.0 | 0.935 | 15.0 |
| Dupont Elvax 450 | 8.0 | 0.940 | 18.0 |

Elvax is a trademark of Dupont for ethyl vinyl acetate copolymer.

The various lubricants used in such experiments were as follows:

LUBRICANTS

Kemamide U (oleamide)
Kemamide E (erucamide)
Kemamide W-40 (ethylene-bis-stearamide)
Kemamide W-20 (ethylene-bis-oleamide)

Kemamide is a trademark of Humko Chemical Division of Witco Corporation.

As used herein, the components of the composition are abbreviated as follows:

olea=oleamide
eruc=erucamide
EBS=ethylene bis stearamide
EBO=ethylene bis oleamide In such an experiment testing for coefficient of friction (COF), mixtures of the additives intended to function as lubricants were provided as follows with the results indicated:

| ratio | olea/eruc | EBS/EBO | EBS/eruc | EBS/olea | EBO/eruc | EBO/olea |
|---|---|---|---|---|---|---|
| 100/0 | 1.040 | 2.970 | 2.970 | 2.970 | 4.050 | 4.050 |
| 50/50 | 0.900 | 2.790 | 1.060 | 0.990 | 1.280 | 1.10 |
| 0/100 | 1.510 | 3.970 | 1.510 | 1.040 | 1.510 | 1.040 |

With the exception of the EBO/oleamide mixture, the binary mixture exhibit lower coefficient of friction (COF) values than the individuals by themselves. This approach was extended in the erucamide and oleamide systems mixed with EBS and EBO to find the optimum ratio of the lubes that would give the minimum COF.

The following tables show the result at 1% total concentration of lubricant with the ethylene vinyl acetate (EVA):

EBS/Oleamide and
Erucamide Mixes

-continued

| % EBS | COF (erucamide mix) | (oleamide mix) |
|---|---|---|
| 0% | 1.510 | 1.040 |
| 25% | 1.340 | 1.030 |
| 50% | 1.060 | 0.990 |
| 75% | 1.270 | 1.330 |
| 100% | 2.970 | 2.970 |

| | EBO/Oleamide and Erucamide Mixes | |
|---|---|---|
| % EBO | COF (erucamide mix) | (oleamide mix) |
| 0% | 1.510 | 1.040 |
| 25% | 1.090 | 0.990 |
| 50% | 1.330 | 1.110 |
| 75% | 1.260 | 1.170 |
| 100% | 3.870 | 3.870 |

The data shows that the 50:50 mix of EBS to erucamide and or oleamide produces the optimum ration whereas with EBO mixtures, the optimum ratio is 25% EBO blended with erucamide or oleamide.

Concentration of Mixtures

The effects of total concentration of the mixtures were explored. COF measurement of 50:50 EBS mixtures with erucamide and oleamide are shown in the following table:

| % total lubricants | erucamide/EBS | oleamide/EBS |
|---|---|---|
| 1.0% | 1.060 | 0.990 |
| 0.75% | 1.100 | 1.070 |
| 0.5% | 1.110 | 1.120 |

As when erucamide and oleamide are utilized as single components, the concentration of the mixed lubricants only slightly affects the COF in the range of concentrations tested.

In further tests, the following results in removal torques were obtained:

| | COMPOSITIONS | | | | |
|---|---|---|---|---|---|
| | CONTROL | A | B | C | D |
| ELVAX 750 | — | — | 100 | 100 | — |
| ELVAX 650 | 100 | 100 | — | — | 100 |
| EBS | — | 0.5 | 0.5 | 0.5 | 0.5 |
| ERUCAMIDE | — | 0.5 | 0.5 | — | — |
| EBO | 1.5 | — | — | — | — |
| OLEAMIDE | — | — | — | 0.5 | 0.5 |
| LDPE (30MF) | 10 | 10 | 10 | 10 | 10 |
| PACK RESULTS: | | | | | |
| REMOVAL TORQUE (RT) IMMEDIATE | 12.0 | 7.8 | 8.2 | 8.2 | 7.6 |
| 1 DAY | 11 | 10 | 10.3 | 12.6 | 11.2 |
| 1 WEEK | 15.0 | 13.8 | 14.0 | 12.6 | 14.0 |
| CO2-1 WEEK | 3.85 | 3.84 | 3.80 | 3.86 | 3.85 |

It can be seen that the compositions A, B, C, D provided lower removal torques than the EVA control alone.

Other tests covering immediate and removal torques, comprises the compositions A and Control:

| | A | Control |
|---|---|---|
| Immediate | | |
| avg. | 14.2 | 19.4 |
| sigma | 1.27 | 1.51 |
| mn/mx | 12/16 | 16/22 |
| 1 Day | | |
| avg. | 20.2 | 20.8 |
| sigma | 1.84 | 11.1 |
| mn/mx | 18/24 | 19/22.5 |
| 1 Week | | |
| avg. | 17.0 | 16.0 |
| sigma | 1.78 | 1.89 |
| mn/mx | 15.5/20 | 14/20 |
| 2 Weeks | | |
| avg. | 17.9 | 17.7 |
| sigma | 1.63 | 1.96 |
| mn/mx | 15.5/20 | 14/21.5 |
| 4 Weeks | | |
| avg. | 18.5 | 16.9 |
| sigma | 1.37 | 1.70 |
| mn/mx | 16.5/20 | 14.5/19 |

I claim:

1. A plastic closure comprising
a base wall having an inner surface,
a peripheral skirt extending from said base wall, and
a liner compression molded on said inner surface of said base wall,
said liner comprising
(a) ethylene vinyl acetate composition,
(b) a primary fatty acid amide selected from the group consisting of an oleamide and an erucamide,
(c) a bis-fatty acid amide,
the total amount of primary fatty acid amide and bis-fatty acid amide being about 0.5%–1.5% by weight based on the weight of the ethylene vinyl acetate,
the ethylene vinyl acetate comprising about 85%–94% by weight of polyethylene and about 6%–15% by weight of vinyl acetate,
the ratio of primary fatty acid amide to bis-fatty acid amide ranges between 25:75 and 75:25, by weight.

2. The closure set forth in claim 1 wherein said bis-fatty acid amide is selected from the group consisting of ethylene-bis-oleamide and ethylene-bis-stearamide.

* * * * *